United States Patent
Lee et al.

(10) Patent No.: US 8,745,187 B2
(45) Date of Patent: *Jun. 3, 2014

(54) SYSTEM AND METHOD FOR INSTALLING SMART CARD APPLET

(75) Inventors: Kyung Ok Lee, Seoul (KR); Jin Tae Kim, Seoul (KR); Eun Su Jung, Gwacheon-si (KR)

(73) Assignee: SK Planet Co., Ltd., Seoul (KR)

( * ) Notice: Subject to any disclaimer, the term of this patent is extended or adjusted under 35 U.S.C. 154(b) by 172 days.

This patent is subject to a terminal disclaimer.

(21) Appl. No.: 12/866,607

(22) PCT Filed: Oct. 9, 2009

(86) PCT No.: PCT/KR2009/005796
§ 371 (c)(1),
(2), (4) Date: Oct. 26, 2010

(87) PCT Pub. No.: WO2010/041901
PCT Pub. Date: Apr. 15, 2010

(65) Prior Publication Data
US 2011/0047257 A1   Feb. 24, 2011

(30) Foreign Application Priority Data
Oct. 10, 2008   (KR) .................. 10-2008-0099809

(51) Int. Cl.
*G06F 15/173*   (2006.01)

(52) U.S. Cl.
USPC ............ 709/223; 709/227; 709/201; 709/217

(58) Field of Classification Search
USPC .................................. 709/223, 227, 201, 217
See application file for complete search history.

(56) References Cited

U.S. PATENT DOCUMENTS

| | | | | |
|---|---|---|---|---|
| 7,191,288 B2 * | 3/2007 | de Jong | ......................... | 711/115 |
| 7,437,560 B1 * | 10/2008 | Page et al. | ..................... | 713/176 |
| 8,090,842 B2 * | 1/2012 | Schirar et al. | ................. | 709/227 |
| 8,280,986 B2 * | 10/2012 | Deprun | ......................... | 709/219 |
| 2010/0287307 A1 * | 11/2010 | John | ............................. | 709/248 |
| 2011/0007899 A1 * | 1/2011 | Park et al. | ..................... | 380/270 |

FOREIGN PATENT DOCUMENTS

| | | |
|---|---|---|
| JP | 2005275620 | 10/2005 |
| KR | 10-2005-0053920 | 6/2005 |
| KR | 1020050074858 | 7/2005 |
| KR | 10-0723688 | 5/2007 |
| KR | 10-0781136 | 11/2007 |

(Continued)

OTHER PUBLICATIONS

International Search Report for PCT/KR2009/005796, citing the above reference(s).

(Continued)

*Primary Examiner* — Lan-Dai T Truong
(74) *Attorney, Agent, or Firm* — Lowe Hauptman & Ham, LLP (57) ABSTRACT

Disclosed are a system and a method for installing a smart card applet. A response message for an OTA message received from an external remote server is transmitted to form a communication channel based on HTTP (hyper text transfer protocol) between a smart card and the remote server. The applet is installed based on applet installation information received through the communication channel. A large scale applet is installed in a card within a short period of time.

18 Claims, 5 Drawing Sheets

(56) References Cited

FOREIGN PATENT DOCUMENTS

| KR | 100840901 | | 6/2008 |
|----|-----------|--|--------|
| WO | 01/08110 | | 2/2001 |
| WO | 2005/053335 | | 6/2005 |
| WO | 2007/074119 | | 7/2007 |
| WO | 2007131540 | A1 | 11/2007 |
| WO | 2008068963 | A1 | 6/2008 |

OTHER PUBLICATIONS

Korean Office Action mailed Aug. 10, 2012 for Korean Patent Application No. 10-2009-0096302, citing the above reference(s).
Chinese Office Action for 200980108289.6 dated Feb. 1, 2013, citing the above reference(s).
Japanese Office Action for application No. 2011-530950 dated Oct. 22, 2013, citing the above reference(s).

* cited by examiner

SYSTEM AND METHOD FOR INSTALLING SMART CARD APPLET

CROSS REFERENCE TO RELATED APPLICATION

This application claims the priority of Korean Patent Application No. 10-2008-0099809, filed on Oct. 10, 2008 in the KIPO (Korean Intellectual Property Office), the disclosure of which is incorporated herein in their entirety by reference. Further, this application is the National Phase application of International Application No. PCT/KR2009/005796, filed Oct. 9, 2009, which designates the United States and was published in English. Each of these applications is hereby incorporated by reference in their entirety into the present application.

TECHNICAL FIELD

Exemplary embodiments relate to a method for installing a smart card applet, and more particularly, to a system and a method for installing a smart card applet, in which the smart card applet is installed in a smart card equipped with a USIM (universal subscriber identity module) function and managed according to the request of the user through the OTA (over the air) mode employing HTTP (hyper text transfer protocol) based on an SCWS (smart card web server).

BACKGROUND ART

Recently, with the development of communication technologies, USIM cards have been extensively used to provide 3G mobile communication services. In addition, various technologies have been suggested to install various applets in one USIM card and to manage the applets.

The applets executed in the USIM card are issued through the connect mode in which a card is inserted into a contact reader when the card is initially manufactured or through the wireless network by SMS (short message service) OTA.

In the case of the SMS OTA, the applets having a large size of 2-3 Kbytes may not be issued due to the limitation in the size of the short message (140 bytes). For this reason, the applets are mainly issued through the connect mode as the card is manufactured.

However, recently, a large scale smart card has been developed, so there are limitations in terms of time and efficiency to install various services satisfying various needs of the user in the large scale smart card when the large scale smart card is manufactured. Thus, in order to effectively use the large scale smart card, large scale applets must be issued and managed according to the needs of the user after the large scale smart card has been manufactured.

DISCLOSURE

Technical Problem

Exemplary embodiments may provide a system and a method for installing a smart card applet, in which applets can be installed and managed according to the request of the user from a remote region by calling a RAM servlet serving as a gateway between an SCWS (smart card web server) and a RAM having the actual applet installation function through the OTA (over the air) mode employing HTTP (hyper text transfer protocol).

Technical Solution

According to one or more embodiments, there may be provided a system for installing a smart card applet, the system including: a remote server for requesting establishment of a communication channel between the remote server and a smart card by transmitting an OTA (over the air) message to the smart card and transmitting applet installation information to the smart card through the communication channel; a terminal for relaying communication between the remote server and the smart card installed in the terminal through a web browser stored in the terminal; and the smart card for transmitting a message in response to the OTA message transmitted thereto from the remote server to establish the communication channel with respect to the remote server based on HTTP (hyper text transfer protocol) and installing the applet based on the applet installation information transmitted thereto through the communication channel.

According to one or more embodiments, there may be provided a smart card including: an SCWS (smart card web server) for establishing a communication channel between a remote server and the smart card based on HTTP by transmitting a message in response to an OTA message transmitted thereto from a remote server and receiving applet installation information from the remote server through the communication channel; a RAM (remote application management) servlet for receiving identity information included in the applet installation information and identifying the remote server based on the identity information; and a RAM for receiving an applet installation code included in the applet installation information and installing the applet based on the applet installation code.

According to one or more embodiments, there may be provided a method for installing a smart card applet, the method including: requesting, by a remote server, establishment of a communication channel between the remote server and a smart card by transmitting an OTA message; establishing, by the smart card, the communication channel based on HTTP by transmitting a message in response to the OTA message; transmitting, by the remote server, applet installation information to the smart card through the communication channel; and installing, by the smart card, the applet based on the applet installation information received from the remote server through the communication channel.

According to one or more embodiments, there may be provided a method for installing a smart card applet, the method including: establishing, by a SCWS, a communication channel based on HTTP by transmitting a message in response to an OTA message received from a remote server; calling, by the SCWS, a RAM servlet when an applet installation request message is received from the remote server; identifying, by the RAM servlet, the remote server based on identity information included in the applet installation request message; transmitting, by the SCWS, an applet installation code to the RAM servlet when the applet installation code is received from the remote server after identification of the remote server has been completed; and installing, by a RAM, the applet when the applet installation code is received from the RAM servlet.

Advantageous Effects

According to the system and the method for installing the smart card applet of the present invention, the applets can be installed and managed according to the request of the user from a remote region by calling the RAM servlet serving as the gateway between the SCWS (smart card web server) and the RAM having the actual applet installation function through the OTA (over the air) mode employing HTTP (hyper text transfer protocol).

BEST MODE

Mode for Invention

Hereinafter, the exemplary embodiments of the present invention will be described in detail with reference to the accompanying drawings.

Figure 1:
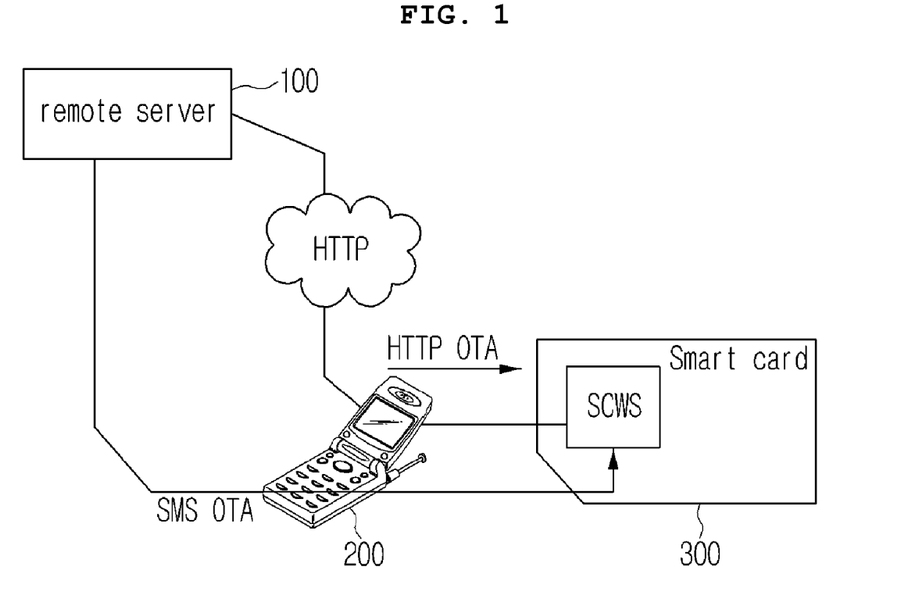
FIG. 1 is a schematic view showing a system for installing a smart card applet according to an embodiment of the present invention.

FIG. 1 is a schematic view showing a system for installing a smart card applet according to an embodiment of the present invention.

As shown in FIG. 1, the system includes a remote server 100 transmitting an OTA message to request establishment of a communication channel with respect to a smart card 300 and transmitting applet installation information through the communication channel, a terminal 200 that relays communication between the remote server 100 and the smart card 300, and the smart card 300 that establishes the communication channel with respect to the remote server 100 through the SCWS (smart card web server) function based on the USIM (universal subscriber identity module) and installs the applet based on the applet installation information transmitted from the remote server 100 through the communication channel.

The remote server 100 transmits the OTA message using the SMS to the terminal 200 equipped with the smart card 300 to request the establishment of the communication channel. In addition, the remote server 100 transmits applet installation information, such as identity information and an applet installation code, to the smart card 300 through the established communication channel.

The terminal 200 transmits the OTA message to the smart card 300 installed in the terminal 200 by using the SMS. The terminal 200 has a gateway (not shown) for protocol conversion to relay the communication between the smart card 300 and the remote server 100. That is, the terminal 200 converts the connection protocol to the smart card 300, such as a USB (universal serial bus) protocol, into HTTP by using the gateway so that an HTTP message can be transmitted between the remote server 100 and the smart card 300 through the web browser.

The smart card 300 is equipped with the USIM and transmits a message in response to the OTA message transmitted from the remote server 100, thereby establishing a communication channel based on HTTP.

In addition, the smart card 300 installs the applet based on the applet installation information transmitted from the remote server 100 through the established communication channel. In more detail, the smart card 300 invokes an applet installation environment, which is mapped to a URL (uniform resource locator), based on the URL included in the applet installation information. That is, the smart card 300 identifies the remote server 100 based on identity information included in the applet installation information transmitted from the remote server 100 and requests the applet installation code to the remote server 100 after the identification has been completed to install the applet based on the applet installation code transmitted from the remote server 100. Meanwhile, the smart card 300 previously shares a code key with the remote server 100 and coding is performed by using the SHA-1 algorithm based on the code key and the ICCID (integrated circuit card identity) value of the card to perform the result comparison, thereby identifying the remote server 100.

As described above, according to the system for installing the applet in the smart card of the present invention, the applet can be issued by using the HTTP OTA based on the HTTP after the card has been manufactured, so that a large scale applet can be installed in the card within a short period of time and the applet can be easily managed.

Hereinafter, the structure of the smart card 300 will be described in detail with reference to FIG. 2.

Figure 2:
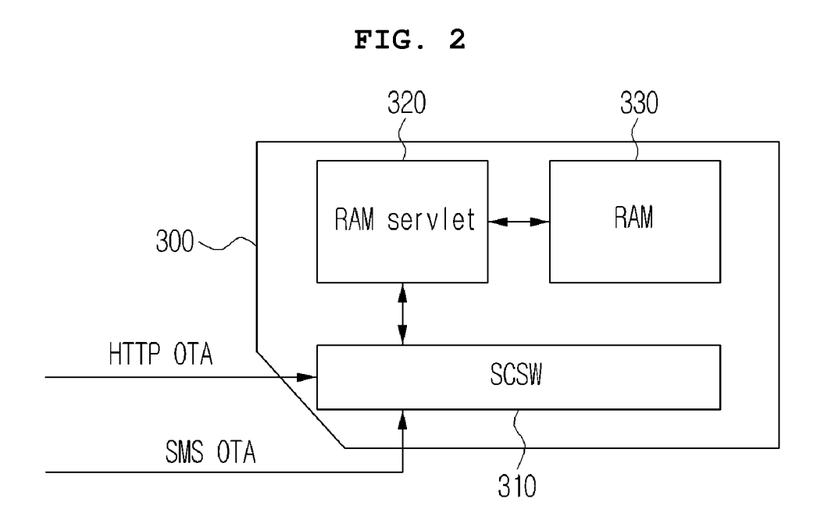
FIG. 2 is a schematic view showing the structure of a smart card according to an embodiment of the present invention.

Referring to FIG. 2, the smart card 300 includes an SCWS (smart card web server) 310, a RAM servlet 320 and a RAM (remote application management) 330.

The SCWS 310 establishes the communication channel by transmitting a message in response to the OTA message transmitted from the remote server 100 and transmits the message by calling the RAM servlet 320 based on the applet installation information transmitted from the remote server 100 through the communication channel. In more detail, the SCWS 310 receives the OTA message in the form of the short message from the remote server 100 and establishes the communication channel based on the HTTP. In addition, the SCWS 310 receives the applet installation information from the remote server 100. In detail, the SCWS 310 receives the applet installation request message based on the URL from the remote server 100 and calls the RAM servlet 320, which is mapped to the URL, to transmit identity information included in the applet installation request message to the RAM servlet 320. Further, the SCWS 310 transmits the applet installation code transmitted from the remote server 100 to the RAM servlet 320 in response to the request from the RAM servlet 320. Preferably, when transmitting the applet installation code to the RAM servlet 320, the SCWS 310 divides the applet installation code according to the settings of the user, which is established by taking the size of the code into consideration. The applet installation request message is transmitted from the remote server 100 in the form of an HTTP message. In addition, a command message defined in ETSI 102.226 and 3GPP TS 23.048, such as a USIM Toolkit command or an open platform command for remote applet management, is included in the body of the HTTP message. Based on the above, the SCWS 310 extracts the actual command message included in the body of the HTTP message for applet installation and transmits the actual command message to the RAM servlet 320. Meanwhile, the SCWS 310 has no function of directly calling the RAM 330 that actually installs the applet. Thus, the SCWS 310 calls the RAM servlet 320 serving as a gateway between the SCWS 310 and the RAM 330 based on the URL included in the applet installation request message, thereby providing the applet installation environment for the RAM 330.

The RAM servlet 320 is called by the SCWS 310 based on the URL and receives identity information included in the applet installation request message to identify the remote server 100. In detail, the smart card 300 previously shares a code key with the remote server 100 and coding is performed by using the SHA-1 algorithm based on the code key and the ICCID (integrated circuit card identity) value of the card to perform the result comparison, thereby identifying the remote server 100. When the identification for the remote server 100 has been completed, the RAM servlet 320 requests the SCWS 310 to transmit the applet installation code, so that the RAM servlet 320 is called again by the SCWS 310 to receive the applet installation code. Further, the RAM servlet 320 calls the RAM 330 and transmits the applet installation code to the RAM 330 such that the RAM 330 can install the applet.

Hereinafter, the software stack structure of the smart card 300 having the above configuration will be described with reference to FIG. 3.

In order to realize the java-based operating system, the smart card 300 may include a card operating system (COS), a java virtual machine, and an application programming interface (API)/global platform. The COS provides environment for controlling and operating the hardware and communication network of the smart card 300. In addition, the java virtual machine and the API/global platform provides an environment to enable the multiple installation of the java-based applets. Further, the smart card 300 includes an issuer security domain (ISD) to ensure security of applications installed in the smart card 300 and a card application toolkit (CAT) framework to support access identification of mobile communication. In addition, the smart card 300 supports the UICC API to check basic information of the card by accessing the file system of CAT execution environment.

The SCWS 310, the RAM servlet 320 and the RAM 330 are operated based on the above stack structure. That is, the SCWS 310 provides a servlet container to support the operating environment for the RAM servlet 320 corresponding to the servlet. In addition, the RAM 330 may install or delete the applet by using the ISD or identification function of other security domains (not shown) upon the request from the SCWS 310 transmitted through the RAM servlet 320.

As described above, the smart card 300 having the above structure according to the present invention can issue the applets by using the HTTP OTA through the SCWS 310 after the smart card 300 has been manufactured, so large scale applets can be installed in the card within a short period of time and the applets can be easily managed.

Figure 4:
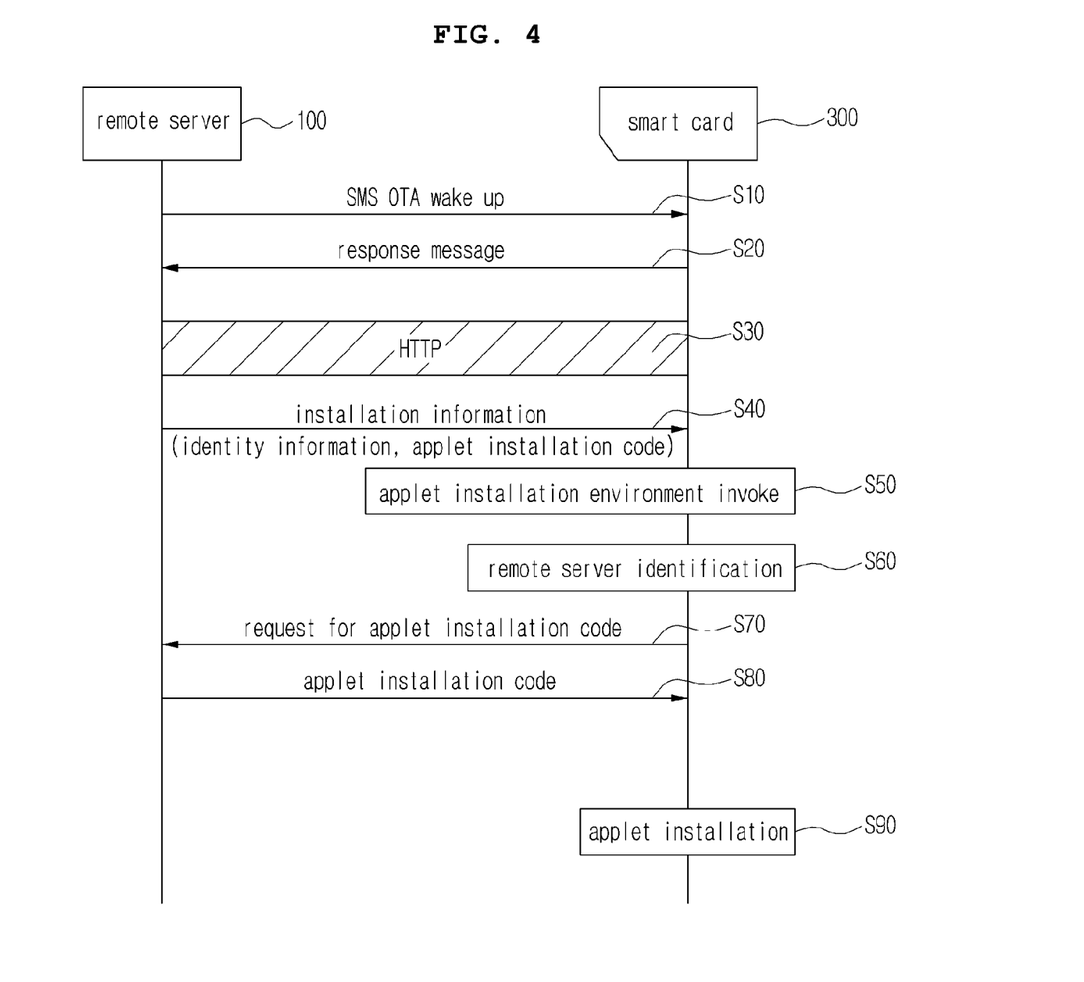
FIG. 4 is a flowchart showing a method of operating a system for installing a smart card applet according to an embodiment of the present invention.
Figure 5:
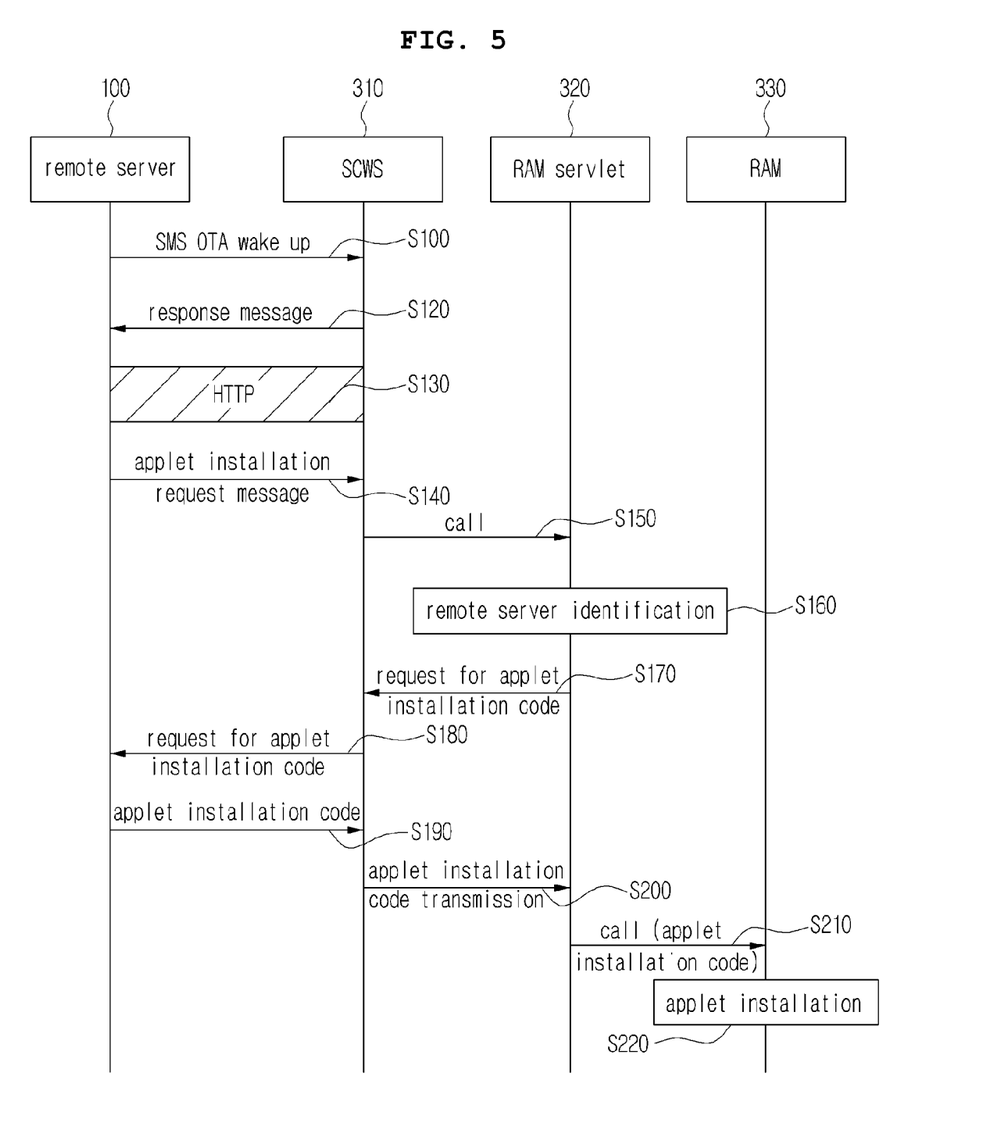
FIG. 5 is a flowchart showing a method of operating a smart card according to an embodiment of the present invention.

Hereinafter, the interface between the terminal and the smart card according to the present invention will be described with reference to FIGS. 4 and 5.

First, a method of operating the system for installing the smart card applet according to an embodiment of the present invention will be described with reference to FIG. 4. For the purpose of convenience, the same reference numerals will be used to refer to the same elements throughout the drawings.

The remote server 100 requests the establishment of the communication channel to the smart card 300 by transmitting the OTA message (S10). Preferably, the remote server 100 transmits the OTA message to the terminal 200 equipped with the smart card 300 by using the SMS to request the establishment of the communication channel.

Then, the smart card 300 transmits the message in response to the OTA message transmitted from the remote server 100 to establish the communication channel with respect to the remote server 100 (S20 and S30). Preferably, the smart card 300 establishes the communication channel based on the HTTP.

After that, the remote server 100 transmits the applet installation request message to the smart card 300 through the established communication channel (S40). Preferably, the remote server 100 transmits the applet installation request message including identity information based on the URL to the smart card 300 through the web browser installed in the terminal 200.

Then, the smart card 300 invokes an applet installation environment, which is mapped to the URL, based on the URL included in the applet installation request message (S50).

That is, the smart card 300 identifies the remote server 100 based on identity information included in the applet installation request message (S60). Preferably, the smart card 300 previously shares the code key with the remote server 100 and coding is performed by using the SHA-1 algorithm based on the code key and the ICCID (integrated circuit card identity) value of the card to perform the result comparison, thereby identifying the remote server 100.

After that, the remote server 100 transmits the applet installation code to the smart card 300 through the communication channel upon the request of the smart card 300 (S70 and S80). Preferably, the remote server 100 transmits the applet installation code to the smart card 300 through the web browser installed in the terminal 200

Then, the smart card 300 installs the applet based on the applet installation code transmitted through the communication channel (S90).

As described above, according to the method for installing the applet in the smart card of the present invention, the applet is installed by using the HTTP OTA after the card has been manufactured, so that a large scale applet can be installed in the card within a short period of time and the applets can be easily managed.

Hereinafter, the operation of the smart card 300 according to the embodiment of the present invention will be described in detail with reference to FIG. 5.

Figure 3:
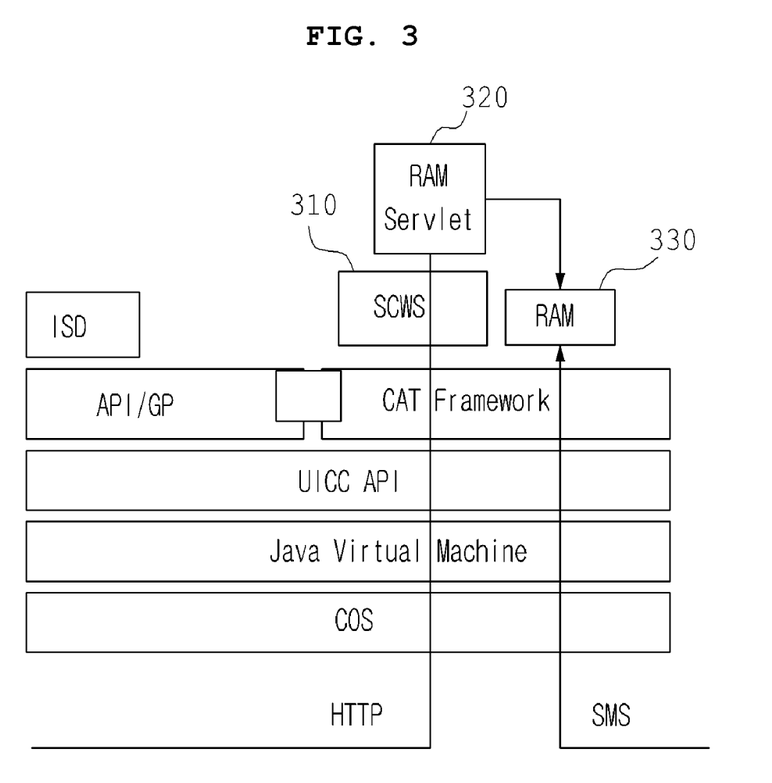
FIG. 3 is a schematic view showing the structure of a software stack of a smart card according to an embodiment of the present invention.

First, the SCWS 310 transmits the message in response to the OTA message transmitted from the remote server 100 to establish the communication channel (S110 to 5130 that correspond to S10 to S30 of FIG. 3). Preferably, the SCWS 310 receives the OTA message in the form of the short message from the remote server 100 to form the communication channel based on the HTTP.

Then, the SCWS 310 receives the applet installation request message from the remote server 100 and calls the RAM servlet 320 (S140 and S150 that correspond to S40 and S50 of FIG. 3). Preferably, the SCWS 310 receives applet installation information from the remote server 100, that is, the applet installation request message based on the URL, and calls the RAM servlet 320 mapped to the URL. In addition, the SCWS 310 transmits identity information included in the applet installation request message to the RAM servlet 320. The SCWS 310 has no function of directly calling the RAM 330 that actually installs the applet. Thus, the SCWS 310 calls the RAM servlet 320 serving as a gateway between the SCWS 310 and the RAM 330 based on the URL included in the applet installation request message, thereby providing the applet installation environment for the RAM 330.

After that, the RAM servlet 320 identifies the remote server 100 based on the identity information included in the applet installation request message (S160 that corresponds to S60 of FIG. 3). Preferably, the smart card 300 previously shares a code key with the remote server 100 and coding is performed by using the SHA-1 algorithm based on the code key and the ICCID (integrated circuit card identity) value of the card to perform the result comparison, thereby identifying the remote server 100.

When the identification for the remote server 100 has been completed, the SCWS 310 receives the applet installation code from the remote server 100 and transmits the applet installation code to the RAM servlet 320 (S170 to S200 that correspond to S70 and S80 of FIG. 3). Preferably, the RAM servlet 320 requests the SCWS 310 to transmit the applet installation code, and the SCWS 310 transmits the applet installation code to the RAM servlet 320 transmitted from the remove server 100 upon the request from the RAM servlet 320. Preferably, when transmitting the applet installation code to the RAM servlet 320, the SCWS 310 divides the applet installation code according to the settings of the user, which is established by taking the size of the code into consideration.

Then, the RAM servlet 320 transmits the applet installation code transmitted from the SCWS 310 to the RAM 330 so that the RAM 330 installs the applet (S210 and 5220 that correspond to S90 of FIG. 3).

As described above, according to the operation of the smart card 300 of the present invention, the applet can be installed by using the HTTP OTA through the SCWS 310 after the card has been manufactured, so that a large scale applet can be installed in the card within a short period of time and the applets can be easily managed.

The method and steps of the algorithm described above related to the embodiments of the present invention may be realized in the form of hardware, software executed by a processor, or a combination of hardware and software. The software module may reside in a storage medium, such as a RAM memory, a flash memory, a ROM memory, an EPROM memory, an EEPROM memory, registers, a hard disc, a mobile disc, a CD-ROM, or other storage devices generally known in the art. The storage medium is connected to the processor, so that the processor may read information from the storage medium or record the information onto the storage medium. Alternatively, the storage medium can be integrated in the processor. The processor and the storage medium may be included in an ASIC. The ASIC may be included in the terminal. Alternatively, the processor and the storage medium may serve as components of the terminal.

Although the exemplary embodiments of the present invention have been described, it is understood that the present invention should not be limited to these exemplary embodiments but various changes and modifications can be made by one ordinarily skilled in the art within the spirit and scope of the present invention as hereinafter claimed.

INDUSTRIAL APPLICABILITY

The system and method for installing the smart card applet according to the present invention can install the applet in the smart card and manage the applet according to the request of the user based on the SCWS through the OTA mode employing the HTTP. Thus, the present invention overcomes the problems occurring in the prior art, so that the present invention is applicable in various fields in terms of sales and business and very useful in practice with higher industrial applicability.

The invention claimed is:

1. A system for installing a smart card applet, the system comprising:
a remote server configured to
request establishment of a communication channel between the remote server and a smart card by transmitting an OTA (over the air) message to the smart card, and
transmit applet installation information to the smart card through the communication channel;
a terminal configured to relay communication between the remote server and the smart card installed in the terminal through a web browser stored in the terminal; and
the smart card configured to
transmit a message in response to the OTA message transmitted thereto from the remote server to establish the communication channel with respect to the remote server based on HTTP (hyper text transfer protocol), and
install the applet based on the applet installation information transmitted thereto through the communication channel,
wherein the smart card comprising:
an SCWS (Smart Card Web Server) configured to
establish the communication channel between the remote server and the smart card based on HTTP by transmitting a message in response to the OTA message transmitted thereto from the remote server, and
receive the applet installation information from the remote server through the communication channel;
a RAM (Remote Application Management) servlet configured to
receive identity information included in the applet installation information, and
identify the remote server based on the identity information; and
a RAM configured to
receive an applet installation code included in the applet installation information, and
install the applet based on the applet installation code.

2. The system of claim 1, wherein the remote server is further configured to transmit the OTA message in the form of an SMS (short message service) to the smart card.

3. The system of claim 1, wherein the smart card is further configured to invoke an applet installation environment, which is mapped to a URL (uniform resource locator), based on the URL included in the applet installation information.

4. The system of claim 3, wherein the smart card is further configured to identify the remote server based on identity information included in the applet installation information.

5. The system of claim 4, wherein the smart card is further configured to install the applet based on an applet installation code included in the applet installation information when identification of the remote server has been completed.

6. A smart card comprising:
an SCWS (smart card web server) for establishing a communication channel between a remote server and the smart card based on HTTP by transmitting a message in response to an OTA message transmitted thereto from a remote server and receiving applet installation information from the remote server through the communication channel;
a RAM (remote application management) servlet for receiving identity information included in the applet installation information and identifying the remote server based on the identity information; and
a RAM for receiving an applet installation code included in the applet installation information and installing the applet based on the applet installation code.

7. The smart card of claim 6, wherein the SCWS receives the OTA message in the form of a short message to establish the communication channel.

8. The smart card of claim 6, wherein the SCWS calls the RAM servlet when an applet installation request message based on a URL included in the applet installation information is received from the remote server, and transmits the identity information and the applet installation code to the RAM servlet.

9. The smart card of claim 6, wherein the RAM servlet receives the applet installation code from the SCWS when identification of the remote server has been completed and calls the RAM, and transmit the applet installation code to the RAM.

10. The smart card of claim 9, wherein the SCWS divides the applet installation code based on the size of the applet installation code and transmits the divided applet installation code to the RAM servlet.

11. A method for installing a smart card applet, the method comprising:
   requesting, by a remote server, establishment of a communication channel between the remote server and a smart card by transmitting an OTA (over the air) message;
   establishing, by a SCWS (Smart Card Web Server) of the smart card, the communication channel based on HTTP (hyper text transfer protocol) by transmitting a message in response to the OTA message;
   transmitting, by the remote server, applet installation information to the smart card through the communication channel; and
   installing, by the smart card, the applet based on the applet installation information received from the remote server through the communication channel,
   wherein the step of installing comprises:
   calling, by the SCWS, a RAM (Remote Application Management) servlet when an applet installation request message is received from the remote server;
   identifying, by the RAM servlet, the remote server based on identity information included in the applet installation request message;
   transmitting, by the SCWS, an applet installation code to the RAM servlet when the applet installation code is received from the remote server after identification of the remote server has been completed; and
   installing, by a RAM, the applet when the applet installation code is received from the RAM servlet.

12. The method of claim 11, wherein the remote server transmits the OTA message in the form of an SMS (short message service) to the smart card.

13. The method of claim 11, wherein the installing comprises:
   invoking an applet installation environment, which is mapped to a URL (uniform resource locator), based on the URL included in the applet installation information;
   identifying the remote server based on identity information included in the applet installation information; and
   installing the applet based on an applet installation code included in the applet installation information when identification of the remote server has been completed.

14. A method for installing a smart card applet, the method comprising:
   establishing, by a SCWS (Smart Card Web Server), a communication channel based on HTTP (hyper text transfer protocol) by transmitting a message in response to an OTA (over the air) message received from a remote server;
   calling, by the SCWS, a RAM (Remote Application Management) servlet when an applet installation request message is received from the remote server;
   identifying, by the RAM servlet, the remote server based on identity information included in the applet installation request message;
   transmitting, by the SCWS, an applet installation code to the RAM servlet when the applet installation code is received from the remote server after identification of the remote server has been completed; and
   installing, by a RAM, the applet when the applet installation code is received from the RAM servlet.

15. The method of claim 14, wherein the SCWS receives the OTA message in the form of a short message from the remote server.

16. The method of claim 14, wherein the calling calls the RAM servlet, which is mapped to an URL, based on the URL included in the applet installation request message.

17. The method of claim 14, wherein the transmitting comprises:
   dividing the applet installation code based on the size of the applet installation code; and transmitting the divided applet installation code to the RAM servlet.

18. A non-transitory storage medium comprising computer readable code to control at least one processing device to implement a method for installing a smart card applet, the method comprising:
   establishing, by a SCWS (Smart Card Web Server), a communication channel based on HTTP (hyper text transfer protocol) by transmitting a message in response to an OTA (over the air) message received from a remote server;
   calling, by the SCWS, a RAM (Remote Application Management) servlet when an applet installation request message is received from the remote server;
   identifying, by the RAM servlet, the remote server based on identity information included in the applet installation request message;
   transmitting, by the SCWS, an applet installation code to the RAM servlet when the applet installation code is received from the remote server after identification of the remote server has been completed; and
   installing, by a RAM, the applet when the applet installation code is received from the RAM servlet.

* * * * *